United States Patent [19]

Carmien

[11] 4,367,969
[45] Jan. 11, 1983

[54] BUSHING FOR ATTACHING FIBERGLASS TOOL HANDLES

[76] Inventor: Joseph A. Carmien, P.O. Box 1165, Sun Valley, Calif. 91352

[21] Appl. No.: 71,177

[22] Filed: Aug. 31, 1979

[51] Int. Cl.³ .......................... B25G 3/00; F16B 9/00; F16L 41/00
[52] U.S. Cl. .................................. 403/253; 403/263; 403/369; 145/29 R
[58] Field of Search ....................... 403/253, 263, 269; 403/369, 268, 351, 368, 374, 409, 310; 145/29 R, 61 R, 61 C; 16/110 R

[56] References Cited

U.S. PATENT DOCUMENTS

| | | | |
|---|---|---|---|
| 1,156,314 | 10/1915 | Rheinberger | 403/253 |
| 1,399,172 | 12/1921 | Vaughan | 403/250 |
| 1,914,802 | 6/1933 | Cochrane | 403/253 |
| 2,634,142 | 4/1953 | Cernea | 403/369 |
| 2,831,202 | 4/1958 | Lay | 145/61 R |
| 3,753,602 | 8/1973 | Carmien | 403/369 |
| 3,819,288 | 6/1974 | Carmien | 403/263 |
| 4,030,847 | 6/1977 | Carmien | 403/263 |
| 4,205,417 | 6/1980 | Mackal | 403/369 |

Primary Examiner—Wayne L. Shedd
Attorney, Agent, or Firm—Fulwider, Patton, Rieber, Lee & Utecht

[57] ABSTRACT

A bushing for connecting a tool head with a tapered eye to a fiberglass tool handle. The bushing, formed in two sections, is mounted around and over a tongue on the distal end of the handle and is configured externally to be wedged by driving the bushing and handle in proximal direction to the eye of the tool head. Complementary double tapers on the tongue and the corresponding interior surface of the bushing are pressed into engagement when the bushing is driven into place in the tool head. The tapers on the tongue hold the bushing longitudinally in place on the handle. Spacers having the double tapered shape and/or flexible shims are provided for expanding the bushing to adapt it to fit larger eyes and to accommodate manufacturing tolerances of the tool eye hole. The cross sections of the eye and bushing are ovate with the major axis of such oval shape perpendicular to a striking face on said head.

1 Claim, 8 Drawing Figures

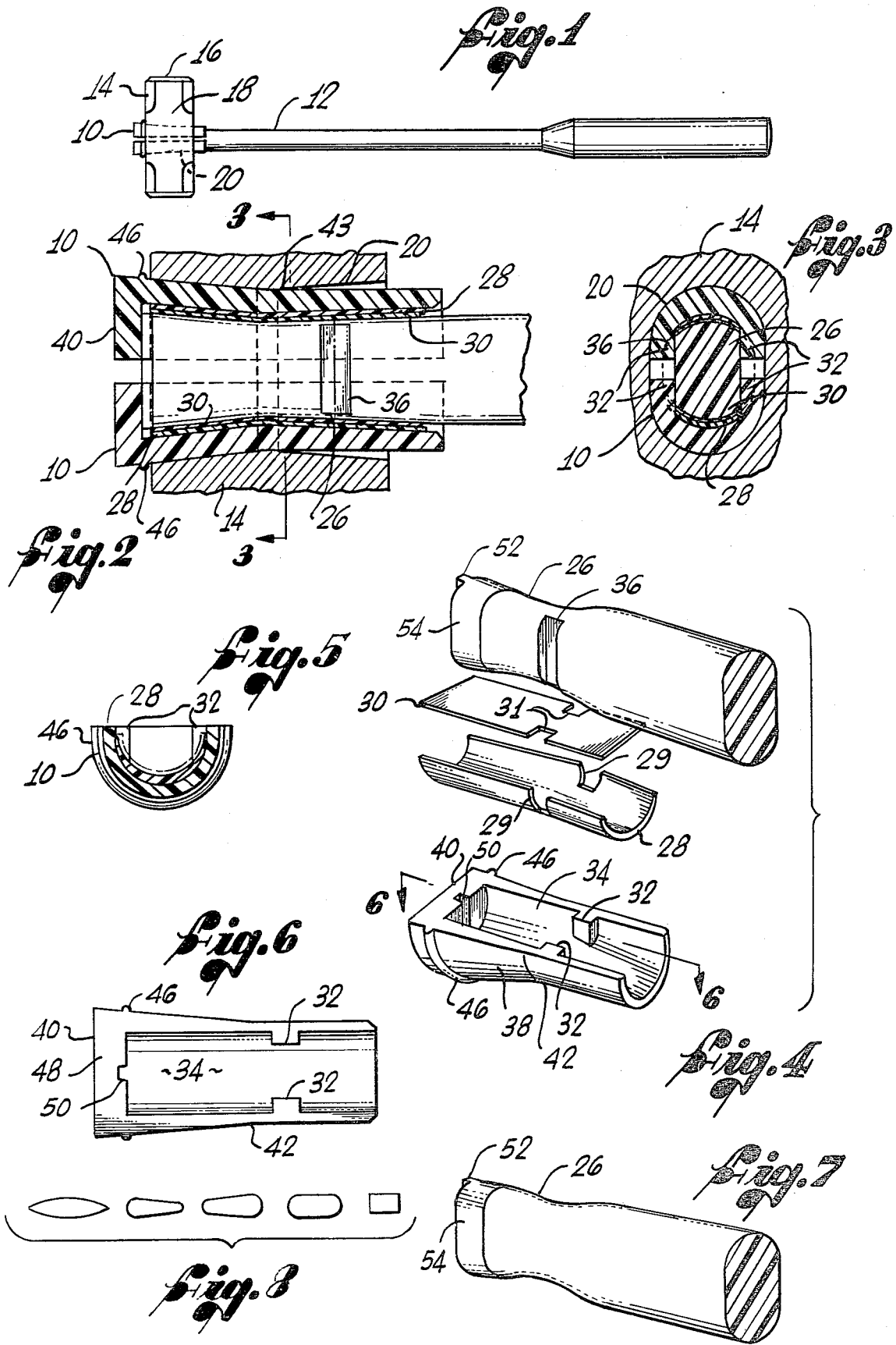

BUSHING FOR ATTACHING FIBERGLASS TOOL HANDLES

BACKGROUND OF THE INVENTION

This invention relates to a bushing for connecting high strength tool handles made of fiberglass to conventional tool heads as replacements for conventional wooden handles.

Eyes found in conventional tool heads often have a double taper or venturi shape that is intended to receive the tongue of a wooden handle having a decreasing single taper. The tongue's tapered surface engages the decreasing taper in the venturi-shaped eye. The end of the tongue is then spread open to engage the increasing taper of the eye by a wedge driven into the end of the tongue.

The tongues of fiberglass handles cannot be satisfactorily spread with a wedge and thus cannot be attached to conventional tool heads in the conventional manner.

Bushings for connecting fiberglass handles to tool heads having conventional double tapered or venturi-shaped eyes have been developed and are described in my U.S. Pat. No. 3,819,288. Such bushings, longitudinally split into two sections, make it possible to fit high strength fiberglass or any reinforced handle shaft that is essentially non malleable handles into tool heads having conventionally shaped eyes. The bushings or adapters are placed between the handle and tool head and are held in place on the handle by transverse key-like projections on the interior of the the bushing which engage transverse slots in the handle.

In order to accommodate variations in both the size of the eye in tool heads and the size of handles, spacers and shims can be placed between the handle and the bushing sections. These spacers and shims move the bushing sections outwardly from the handle and increase the outside dimension of the bushing.

In the previous construction, as the bushing sections are moved outwardly from the handle by the insertion of spacers, the area of engagement between the projections and the handle slots is reduced. Should the area of contact of between the projections and slots be greatly reduced, significant stresses could be induced at or near that area when the tool is used. Failure at such stress point could in the prior construction result in the bushing sliding off the tongue of the handle. Thus, to reduce the possibility of such stresses there existed a need for an improved bushing which will prevent longitudinal axisl movement of the bushing with respect to the handle even when the area of contact between the projections and slots is reduced. Such an improved bushing would ideally be easy to install, be configured so as to match the conventional venturi shape of the eye in the tool head. The improved bushing with the associated spacers is further capable of being adapted to fit a wide range of sizes of eye holes.

The present invention fulfills those needs.

SUMMARY OF THE INVENTION

The interior surface of the improved bushing of the present invention includes a double taper that mates with a complementarily shaped double taper on the tongue of the handle. The tapered surfaces hold the bushing in place on the tongue and prevent the bushing from moving axially along the handle. The cross sections of the eye bore in the head of the exterior are complementary. The interior of the bushing and the tongue in a sledge hammer head are ovate or elliptical with the major axis of such oval perpendicular to a striking face of such tool head, while the exterior and interior configurations of the bushing and tongue used in other heads such as a single bit axe approaches the shape of the eye of such heads. The bushing is split on a longitudinal plane through the minor axis of such oval.

Spacers and shims can be placed between the bushing and tongue to increase the outside dimension of the bushing and adapt it to engage larger eye bores or decrease the interior to be used with smaller handles. The spacers have the double tapered shape of both the handle and bushing, thus the engagement between the double tapered handle and bushing is not adversely affected as spacers are added. The thin flexible shims which are used for fine adjustment adopt the double tapered shape when placed inside the bushing and the bushing is driven into position. The double tapered shape on tongues and bushings can be used in combination with transverse key-like projections formed on the bushing that engage slots in the tongue.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 1 is a side elevational view showing a tool head joined to a fiberglass handle by a bushing of the invention;

FIG. 2 is a longitudinal sectional view of the bushing portion of the tool shown in FIG. 1, showing a tongue on the handle, a bushing and the interior of an eye in the head;

FIG. 3 is a transverse sectional view of the bushing taken substantially along the line 3—3 of FIG. 2;

FIG. 4 is an exploded isometric view showing the distal end of the handle whose tongue has a double taper and a pair of key slots, a spacer, a shim and one section of the bushing;

FIG. 5 is a transverse sectional view showing the bushing section, with the spacer insert mounted therein and a shim shown in phantom line;

FIG. 6 is a plan view taken substantially in the direction of the arrows 6—6 of FIG. 4 and showing the interior of the bushing;

FIG. 7 is an isometric view showing the tongue end of a handle;

FIG. 8 is an end view of a variety of eye hole shapes for tool heads.

DETAILED DESCRIPTION

As shown in the exemplary drawings, particularly FIG. 1 the present invention is embodied in an improved bushing 10 forming a tool joint used to connect a fiberglass handle 12 to a tool head 14. The tool head 14 include a striking or working face 16, a set of cheeks 18 perpendicular to the striking face and an eye 20 whose axis lies parallel to the planes of the striking face and cheeks 18. The eye 20 is characterized by a double tapered rounded shape having an elliptical or ovate cross section whose dimensions at its smallest point are typically one inch for the minor axis and $1\frac{1}{4}$ to $1\frac{3}{8}$ inch for the major axis.

The tool head 14 is carried at the end of a fiberglass handle 12 made of fiberglass or other generally non-malleable material, as is shown in FIGS. 2 and 3, a typical illustration, which has a tongue 26 received within the eye 20. The tongue 26 has a generally ovate cross section whose major diameter is about 1¼ inch and whose minor diameter is about 1 inch.

As is described in my U.S. Pat. No. 3,819,288 the head 14 is joined to the handle 12 by inserting the tongue 26 through the eye 20 until it extends beyond the eye. As shown in FIG. 2, the bushing 10, preferably formed of a tough, semi-resilient plastic material longitudinally split into two sections, is then attached to and over the tongue 26 and thereafter the tongue, with the bushing sections attached, is pressed or driven back into the eye 20 where the bushing is held in place in the eye by friction and by the resilient force exerted by the bushing and tongue. In the past the bushing 10 has been held in place on the tongue 26 by key-like projections 32 on the bushing engaging slots 36 in the handle of the type shown in FIG. 4. The projections 32 extend from the interior surface 34 or bore of the bushing and engage the slots 36 in the sides of the tongue.

To enable the bushing 10 to accommodate eyes 20 of varying dimensions, spacers 28 can be inserted between the tongue 26 and the bushing. The substantially rigid molded spacers 28 have a shape and curvature complementary to the inside surface of the bushing 10 and tongue 26 and securely snap fit therein. The spacers 28 have a thickness at their midpoint of typically about 0.0062 inches. When a bushing 10, sized to receive a tongue 26 whose major axis in the typical embodiment is 1⅜ inch, is used with a pair of spacers, the bushing can accommodate a tongue whose major axis is as small as 1¼ inch. The tightness of the bushing in the eye is adjusted by adding or removing shims 30 between the bushing 10 and the tongue 26.

In accordance with the present invention, the bushing 10 is locked in place on the tongue 26 through the cooperation of hourglass shaped double tapers on both the tongue and bushing that are held in engagement when the bushing and tongue and pressed into the eye 20. Spacers 28 having the double tapered shape are provided and can be placed between the tongue 26 and bushing 10 to decrease the inside dimension of the bushing or to increase the outside dimension of the bushing or to do both. Because the spacers 28 have the double taper shape and become a part of the double taper locking mechanism the spacers do not degrade the engagement between the bushing and the tongue as they do when they are used with bushings incorporating only the projection 32 and slot 36 locking mechanism.

As can best be seen in FIGS. 2 and 4, the double tapers are located on major axis of the tongue cross section and on the major axis of the interior cross section of the bushing. The tongue 26 and bushing 10 are tapered such that the dimension of said major axis decreases from the distal ends to a minimum size at a portion of the bushing adjacent the midportion or most constricted portion of the eye 20. From this minimum size, the dimension of the major axis increases in the proximal direction throughout the remainder of the length of the bushing.

It will be appreciated that the description of the shape of the eye 20 and the bushing 10 and the appended claims is directed toward a head 14 having an elliptical eye as shown in FIG. 1, but that the double taper tongue-bushing engagement of the invention can be used in bushings adapted to fit a variety of eye holes as is shown in FIG. 8.

As is shown in FIGS. 4 and 6, in the striking head embodiment of the invention the improved bushing 10 has the same exterior shape as the bushing disclosed in my U.S. Pat. No. 3,819,288. The bushing's exterior surface 38 tapers inwardly generally at an angle of about 4 degrees from the distal end 40 of the bushing to a point 42 approximately midway along the bushing. From the midway point 42, the walls continue without taper to the proximal end of the bushing 10. A circumferential ridge 46 protrudes outwardly of the bushing's exterior surface 38 at a location near the distal end 40. The ridge 46 is positioned to lie adjacent to opening of the eye 20 when the bushing is properly longitudinally located within the eye. The taper of the exterior surface 38 of the bushing between the ridge 46 and distal end 40 is greater than the taper of the bushing inward of the ridge and is in excess of 4 degrees.

The ends of the bushing 10 are closed by thick distal walls 48 which are capable of withstanding pounding required to drive the tongue 26 and bushing 10 into position within the eye 20.

The bushing 10 is made of material which will cold flow to a limited degree and will thereby compensate for irregularities in the surface of the eye 20 or tongue 26. The bushing 10 material should have a high coefficient of friction with both the tongue 26 and the eye 20. Glass filled nylon has been found to be the most satisfactory material for fabricating the bushing. Polyurethane, polycarbonate, acrylonitrile, butadiene, as well as other similar moldable materials can be used to make the bushing 10.

The capability to maintain the alignment of the sections of the bushing 10 the tongue 26 when the tongue and bushing are being pressed or driven into the eye 20 can be improved by placing, as is shown in FIG. 4, the typical embodiment, a groove 50 in the interior of the distal end 40 of the bushing and by placing a corresponding key 52 on the distal end of the tongue 26. The key 52, typically has a width of about 1/10 inch, and depth of about 1/16 inch, and extends completely across the end of the tongue 26 in a direction parallel to the major axis of the tongue. The corresponding groove also extends fully across the bushing. The key 52 may be incorporated in a cap 54 made of moldable material which is placed over the end of the tongue and fastened permanently in place there.

In the handle 12 portion of the preferred embodiment of the invention the major diameter of the handle is stepped down from the dimension of the hand grip portion to a section at the base of the tongue 26 having a major dimension of 1.07 inches. In the illustrated embodiment the double tapers, formed into the major axis of the tongue cross section meet at a minimum area point about 1.02 inches inward from the distal end of the tongue 26. The tapers result in the tongue having a major diameter of 0.88 inch at its narrowest point. The cap 54 mounted on the end of the tongue 26 is tapered to coincide with the tongue taper.

As is shown in FIG. 4, the tongue 26 and bushing 10 of the invention can include as an additional engagement means the key-like projections 32 and slots 36. However, it should be understood that the double tapered tongue 26 and bushing 10 of the invention function satisfactorily without the projection and slot 36 and they need not be included. A double tapered tongue 26 without the slot is shown in FIG. 7. The projections 32 serve an additional function of accurately positioning the spacers 28 and shims 30 within the bushing 10 during installation for this purpose notches 29 are formed in the edges of the spacers 28 to engage the projections 32. Similarly, notches 31 are formed in the edges of the shims 30.

In use the handle incorporating the present invention is first inserted into the eye with the tongue projecting on top of the head. The stepped down diameter at the base of the tongue permits the handle to be inserted into the eye far enough to project the entire tongue above the head. The two sections of the bushing 10 together with whatever spacers and/or shims may be needed for the particular installation are then assembled on the tongue. The inner projections 32 and the slots 36 are so oriented with respect to the groove 50 and the key 52 that all of those parts are accurately positioned with respect to each other and properly oriented with respect to the major axis of the tongue cross section. Similarly, the notches 29 in the spacers 28 and the notches 31 in the shims 30 are so dimensioned as to frictionally engage the projections 32 and hold these parts in assembled positioned prior to driving the assembled bushing and handle back into the head for final securing of the handle to the head.

The spacers 28, used to adapt the bushing 10 to fit larger eyes 20, are preferably made in a variety of thicknesses. Spacers 28 having a thickness at their midpoint in the range from 0.060 to 0.200 inches have been successfully used. It will be apparent that spacers 28 need not be employed in identical sized pairs, one being added to each section of the bushing, but that a single spacer or a combination of spacers of differing thicknesses may be added to either of the bushing sections to achieve a desired increase in the outer dimension of the bushing. These spacers 28 as well as the shims 30 may be snapped into the bushing sections 10 in desired combination, each spacer and shim are accurately positioned therein by the projection 32.

From the foregoing it would be appreciated that the double tapered tongue 26 and bushing 10 of the invention provides a sure locking engagement between the tongue and bushing that retains its strength even when spacers having the double tapered shape are placed between the tongue and bushing. The invention permits the bushing to be used with a greater range of sizes of eyes 20 and tool handles 12 and thereby increases the range of sizes of tool heads which can be attached to fiberglass handles.

While several particular forms of the invention have been illustrated and described, it will be apparent that various modifications can be made without departing from the spirit and scope of the invention.

I claim:

1. In a tool joint connecting a tool head to a tool handle in which the tool head being attached has a double tapered opening therethrough with side walls tapering inwardly from the top and bottom thereof, and further including a bushing comprised of a plurality of sections having a combined outwardly tapered exterior formed substantially complementarily to the upper tapered portion of said tool head opening and to fitted therein; the improvement comprising:

a tongue portion of said tool handle to which said tool head is to be attached having a double tapered external surface forming a generally hourglass shape;

said bushing including a double tapered interior surface formed substantially complementarily to said hourglass shaped tongue portion of said tool handle and said bushing is fitted thereon and co-operates, therewith, said upper tapered portion of said tool head opening coacting said outwardly tapered exterior of and forcing said bushing, said double tapered interior of said bushing into intimate contact with said hourglass shaped tongue portion of said tool handle, thereby preventing relative axial movement of said bushing along said tool handle; and means projecting from said tool handle for engaging a cooperating means on said bushing to prevent relative rotation of said bushing with respect to said tool handle about the longitudinal axis of said tool handle.

* * * * *

UNITED STATES PATENT AND TRADEMARK OFFICE
CERTIFICATE OF CORRECTION

PATENT NO. : 4,367,969
DATED : January 11, 1983
INVENTOR(S) : Joseph A. Carmien

It is certified that error appears in the above—identified patent and that said Letters Patent is hereby corrected as shown below:

Col. 1, line 31, delete "the";

Col. 1, line 49, delete "axisl" and insert -- axial --;

Col. 2, line 61, delete "include" and insert -- includes --;

Col. 3, line 42, delete "and" and insert -- are --;

Col. 3, line 52, delete "projection" and insert -- projections --;

Col. 4, line 66, delete "slot" and insert -- slots --;

Col. 5, line 39, delete "projection" and insert -- projections --;

Col. 6, line 19, delete "to";

Col. 6, line 30, delete "coacting" and insert -- contacting --;

Col. 6, line 31, after "of" insert -- said bushing, --;

Col. 6, line 31, after "forcing" delete "said bushing,".

Signed and Sealed this

Twenty-fourth Day of May 1983

[SEAL]

Attest:

DONALD J. QUIGG

Attesting Officer     Acting Commissioner of Patents and Trademarks